J. D. OTSTOT.
Potato-Digger.
No. 26,118. Patented Nov. 15, 1859.
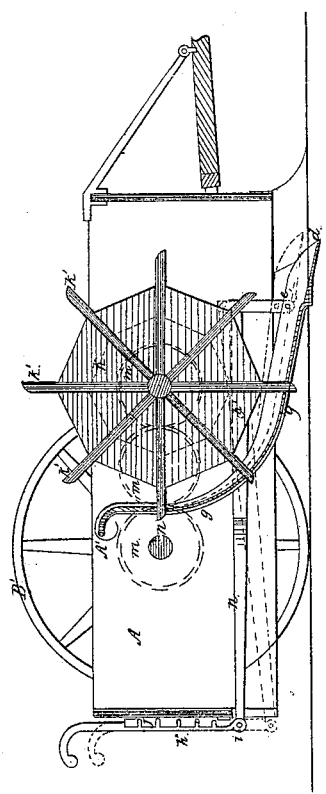
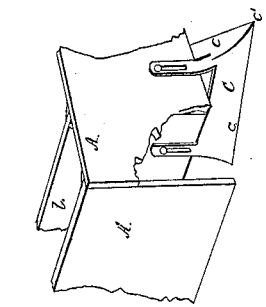
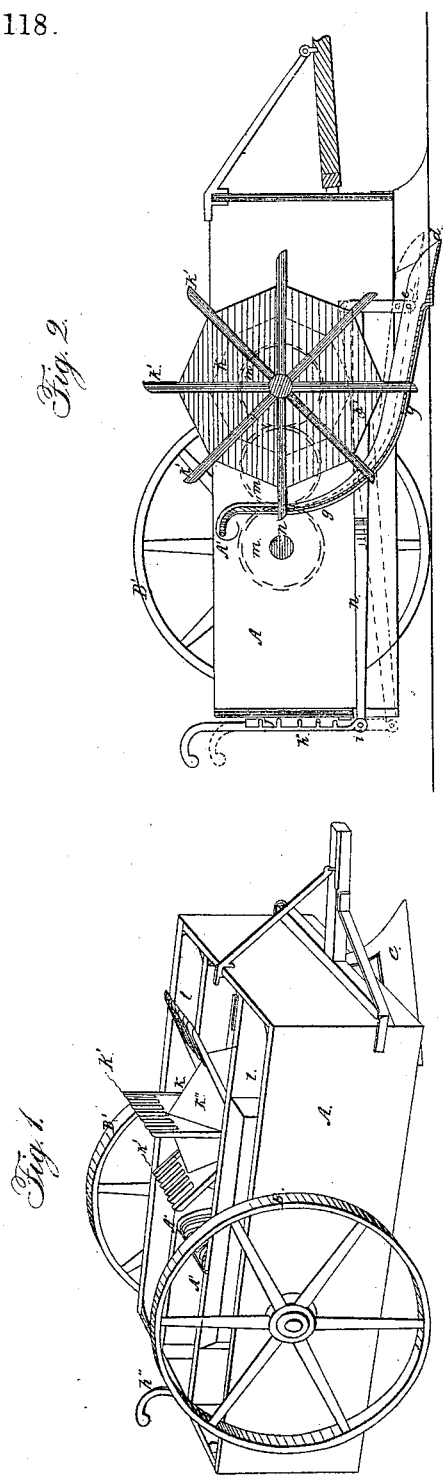
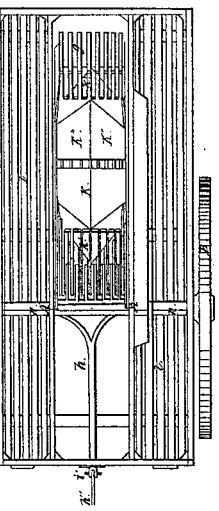
Witnesses:
Inventor:

UNITED STATES PATENT OFFICE.

J. D. OTSTOT, OF SPRINGFIELD, OHIO.

IMPROVEMENT IN POTATO-HARVESTERS.

Specification forming part of Letters Patent No. 26,118, dated November 15, 1859.

*To all whom it may concern:*

Be it known that I, J. D. OTSTOT, of Springfield, in the county of Clarke and State of Ohio, have invented a new and useful Improvement in Potato-Harvesters; and I do hereby declare that the following is a full and clear description thereof, reference being had to the accompanying drawings, and to the letters of reference marked thereon and made to form a part of this specification.

The nature of my invention consists in the combination and arrangement of the several parts set forth in this specification, and enumerated in the claim.

In reference to the accompanying drawings, Figure 1 is a perspective view, and Fig. 2 a vertical sectional view, and Fig. 3 a plan or top view, of the harvester. Fig. 4 is a perspective view, showing specially the adjustable cutter.

A represents the body of the harvester, arranged upon wheels B B' in such manner that its bottom or under side may be quite near to the surface of the ground. Attached to the forward part of the body A in such manner as to be adjustable vertically is a cutter, C. (Clearly shown in Fig. 4.) Said cutter is formed with inclined sides $c$, which diverge from the point $c'$, so that the potato-vines and weeds after being cut may be removed to the sides of the row free from the excavator.

$d$ is the excavator, which is attached to and forms a part of the hopper $g$, and serves as a shovel or scoop, by means of which the potatoes, together with some of the earth by which they are surrounded, are delivered within the receiver or hopper $g$. The said hopper $g$ at its bottom or base is constructed of rods so arranged that the earth may fall between them and the potatoes be retained within the hopper, the upper end of which is pivoted to the body A at A', so that its lower end, which terminates in the excavator $d$, is allowed vertical motion sufficient for the adjustment of the excavator to the proper depth for removing the potatoes from the ground.

$h$ is a jointed and bent lever, pivoted to the body A at $h'$, (shown by dotted lines in Fig. 2,) and secured to the hopper $g$ at $e$, by means of which the proper adjustment of the excavator may be effected. The end $h''$ of the lever is hinged to the said lever $h$ at $i$, and is provided with a pin, $i'$. This portion $h''$ of the lever is formed to fit the rack $j$, into the notches of which the pin $i'$ is made to take, thereby securing any required position of the excavator.

$k$ is a rotary rake or elevator, provided at regular intervals with projecting fingers $k'$, which are so arranged that they pass between the rods of the hopper $g$ as the elevator is made to rotate. The said fingers serve not only as agitators which facilitate the discharge of the earth through the bottom of the hopper $g$, but as conveyers for elevating the potatoes to the top of the rake. The body of the rake at its periphery is formed with a double inclined face, $k''$, so that as the potatoes are conveyed to the top of the rake they must necessarily roll off upon either side of the rake into the bins $l$. The bottoms of said bins are formed of slats, to allow the escape of any loose earth that may fall into them from the rake. The rake $k$ is made to rotate by means of cog-wheels $m$, (shown by dotted lines in Fig. 2,) said cog-wheels being made to operate by the rotation of the axle $n$, to which the driving cog-wheel is secured.

The operation of my invention is fully explained in the description of its construction. Therefore I will not repeat said description.

What I claim as my invention, and desire to secure by Letters Patent, is—

The arrangement and combination of the bent lever $h$ $h''$, excavator $d$, rotary rake $k$ $k'$ $k''$, hoppers $l$ $l$, and driving-wheels B B, substantially in the manner and for the purpose set forth.

In testimony of which invention I have hereunto set my hand in the presence of witnesses.

J. D. OTSTOT.

Attest:
 REUBIN MILLER,
 MARSHFIELD S. STEELE.